United States Patent [19]

Ikeda et al.

[11] Patent Number: 4,950,529
[45] Date of Patent: Aug. 21, 1990

[54] POLYALLYLENE SULFIDE NONWOVEN FABRIC

[75] Inventors: Masataka Ikeda; Tsukasa Shima, both of Nobeoka, Japan

[73] Assignee: Asahi Kasei Kogyo Kabushiki Kaisha, Osaka, Japan

[21] Appl. No.: 269,050

[22] Filed: Nov. 9, 1988

[30] Foreign Application Priority Data

Nov. 12, 1987 [JP] Japan .................................. 62-284346

[51] Int. Cl.$^5$ ............................................. B32B 27/06
[52] U.S. Cl. ...................................... 428/224; 428/419
[58] Field of Search ................................. 428/224, 419

[56] References Cited

U.S. PATENT DOCUMENTS 3,912,695 10/1975 Short et al. ...................... 139/383 R

FOREIGN PATENT DOCUMENTS

| 0102536A3 | 3/1984 | European Pat. Off. . |
| 0195422A2 | 9/1986 | European Pat. Off. . |
| 52-30609 | 3/1973 | Japan . |
| 55-142757 | 7/1980 | Japan . |
| 56-33511 | 4/1981 | Japan . |
| 57-16954 | 1/1982 | Japan . |
| 61-28962 | 12/1986 | Japan . |
| 58-31112 | 2/2983 | Japan . |

Primary Examiner—Marion C. McCamish
Attorney, Agent, or Firm—Finnegan, Henderson, Farabow, Garrett & Dunner

[57] ABSTRACT

A nonwoven fabric having a weight per unit area of 5 g/m$^2$ to 500 g/m$^2$ composed of a polyallyene sulfide fiber having a mean fiber diameter of 0.1 μm to 8.0 μm is provided. The nonwoven fabric of extra fine polyallylene sulfide fibers has superior heat resistance, wet heat resistance, resistance to chemicals and fire retardant properties, suitable for various filter applications.

6 Claims, 2 Drawing Sheets

POLYALLYLENE SULFIDE NONWOVEN FABRIC

BACKGROUND OF THE INVENTION

1. Field of the Invention

The present invention relates to a polyallylene sulfide nonwoven fabric. More particularly, the present invention relates to a nonwoven fabric composed of extra fine fibers of a polyallylene sulfide (hereinafter referred to as PPS) having superior heat resistance, wet heat resistance, resistance to chemicals, and fire retardant properties, and suitable for use in various filter applications.

2. Description of Related Art

PPS fibers can be used as a nonwoven fabric in various applications, for example, filters, fire retardant electrical insulating materials, battery separators or the like, because of its excellent heat resistance, wet heat resistance, resistance to chemicals and fire retardant properties.

A method of obtaining from a resin, a filament having a high-modulus is disclosed in Japanese Examined Patent Publication (Kokoku) No. 52-30609 (corresponding to G.B No. 1420176). The melt flow rate of the resin is lowered by partially precuring the PPS resin to give the PPS resin a high-molecular weight. Japanese Unexamined Patent Publication (Kokai) No. 58-31112 discloses a high speed winding method by which a fiber having a low crystallizing temperature and a high melting point can be obtained.

Further Japanese Unexamined Patent Publication (Kokai) No. 57-16954 discloses a PPS fiber nonwoven fabric manufactured by a spun-bond method in which a flow of a plurality of filaments in a high speed air current is used to obtain a filament web. The filaments are interlaced by a needle punching method. Japanese Unexamined Patent Publication (Kokai) No. 61-289162 disclosed a nonwoven fabric manufactured by heat-fusing a web comprising a blend of heat-resistant fibers and undrawn PPS fibers.

A basic method and apparatus for carrying out a melt-blow process is disclosed in Industrial and Engineering Chemistry, Volume 48, No. 8 published in 1956, from page 1342 to page 1346. Further, a method for manufacturing an extra fine fiber of a polyolefin, a polyester or the like is disclosed in Japanese Examined Patent Publication (Kokoku) No 56-33511 and Japanese Unexamined Patent Publication (Kokai) No. 55-142757. Nevertheless, a nonwoven fabric comprising extra fine fibers of PPS resin is not disclosed in the above references, and heretofore was unknown.

To obtain an efficient filter that can be used under severe conditions of temperature, resistance to chemicals or the like, the fibers constituting the filter must have a high resistance to heat and a high resistance to chemical, in addition to a satisfactory collecting efficiency and pressure loss. To improve the latter requirements, i.e., collecting efficiency and pressure loss, preferably the fiber used is extra fine, and more particularly, the filter is composed of a nonwoven fabric in which the extra fine fibers are randomly arranged.

Although a PPS fiber capable of satisfying the requirements of high heat resistance and high resistance to chemicals is known, a nonwoven fabric made of extra fine fibers and capable of satisfying the latter requirement referred to above have not been obtained from the previously described PPS fiber.

Because PPS resin has a high melting point, a high crystallizability, and a high modulus, it is very difficult to manufacture a fiber having consistant quality or performance by known conventional melt spinning technique used for general fiber-making from polymers such as polyesters, polyamides, polyolefins or the like. In particularly, it has not been possible to manufacture a nonwoven fabric made of PPS fibers having a diameter of 10 μm or less.

Further, since PPS fibers have high stiffness and are brittle, it is extremely difficult to apply to PPS fiber a mechanical crimp as is usually used in processes of manufacturing nonwoven fabric of staple fibers. Additionally, since static electrical properties of PPS fibers are basically high, it is difficult to manufacture a PPS nonwoven fabric by the conventional techniques employed for manufacturing nonwoven fabrics of staple fibers.

Since the nonwoven fabric of the PPS filament disclosed in the Japanese Unexamined Patent Publication (Kokai) No. 57-16954 is manufactured by a spun-bond method in which the formation of a fiber is accompanied by a cool air current, the minimum diameter of the obtained fiber is limited. By the process of this publication, it is impossible to obtain a fiber having a diameter of 10 μm or less. Further, to obtain the disclosed nonwoven fabric, it is necessary to electrostatically disperse the fibers to form a web, to interlace the fibers in the web by needle punching, and to shrink the web at a high temperature. This process of manufacturing a nonwoven fabric takes a long time, and thus this manufacturing method is economically disadvantageous. The biggest problem caused by the relatively large diameter of the fiber is that, when the nonwoven fabric is used for a filter, superior filtering characteristics cannot be obtained. Therefore, the use or application of filters made from such fibers is limited.

The nonwoven fabric disclosed in Japanese Unexamined Patent Publication (Kokai) No. 61-289162 is formed by heat-fusing the fibers in a web. Because there is little or no freedom of movement of the fibers in the web, the nonwoven fabric becomes a hard plate. In particular, this nonwoven fabric has low tear strength. Further, the bulk density of the nonwoven fabric is very large. Thus, when this nonwoven fabric is used for a filter, the pressure loss is great. Furthermore, since a carding machine or the like must be used when manufacturing a web by this method, fibers having a thickness of 1 denier or more, i.e., a diameter of about 10 μm or more, must be used. The handling of the nonwoven fabric becomes more hard due to large diameter of the fiber and the filtering characteristics of the nonwoven fabric are not outstanding. Also, the process for manufacturing this nonwoven fabric has many steps, i.e., cutting the fiber, crimping the cut fiber, forming the web from the crimped fiber, and heat fusing the web. Thus this process is disadvantageous from an industrial production viewpoint.

SUMMARY OF THE INVENTION

An object of the present invention is to provide a nonwoven fabric composed of extra fine fibers of a polyallylene sulfide, i.e., PPS, having superior heat resistance, resistance to chemicals, and fire retardant properties, and suitable for use in various filter applications.

Therefore, in accordance with the present invention, there is provided a polyallylene sulfide nonwoven fabric composed of polyallylene sulfide fibers having a mean fiber diameter of from 0.1 μm to 8.0 μm, and a unit weight of from 5 g/m² to 500 g/m².

DESCRIPTION OF THE PREFERRED EMBODIMENTS

Figure 1:
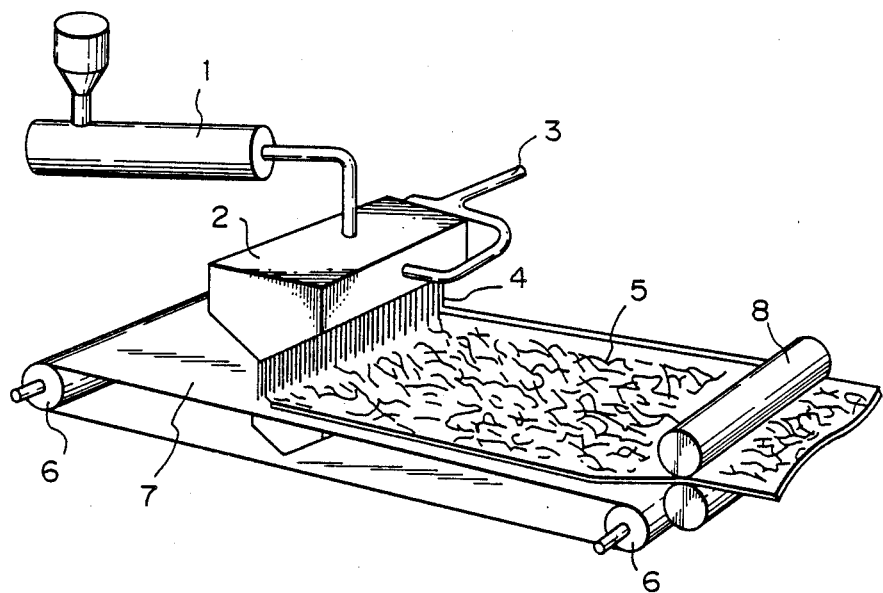
FIG. 1 is a perspective view illustrating, as an example, an apparatus for implementing a melt blow method; and, FIG. 2 is a cross sectional view illustrating, as an example, a main portion of a die which may be used in the melt blow apparatus of FIG. 1.

The PPS fiber in accordance with the present invention is made of a resin having, as a main component, a polyallylene sulfide resin. This resin is a polymer having the following structural formula,

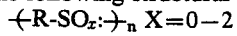

wherein R denotes a phenylene, a biphenylene, a naphthalene, a biphenylene ether, or a derivative thereof substituted with a lower alkyl group having 1 to 6 carbon atoms, a copolymer thereof, an armatic polysulfide group such as a polythioetherketone, a polythioether sulfon or the like, or a copolymer thereof.

Since the nonwoven fabric in accordance with the present invention is composed of a polyallylene sulfide, i.e., PPS, the nonwoven fabric has a superior heat resistance. Specifically, the fabric can be continuously used under temperatures as high as 190° C. This is in contrast to typical maximum continuous use temperature of 80° C. for polypropylene fiber and 120° C. to 130° C. for polyester fiber. PPS fiber also has a superior wet heat resistance, i.e., it can be used in steam having a temperature of up to 160° C.

In addition, PPS fiber has very good resistance to chemicals, i.e., it has an excellent resistance to solvents, resistance to acids, and resistance to alkalis. For example, although nonwoven fabrics composed of a polyester fiber, an aramide fiber or the like are dissolved or modified in a 10% solution of NaOH, a 10% solution of HCl and a 20% solution of H₂SO₄, the nonwoven fabric composed of PPS fiber in accordance with the present invention remains substantially unchanged when immersed in such solutions. Further, the PPS nonwoven fabric has superior fire retardant and electrical resistance properties.

Preferably polyphenylene sulfide is used in order to obtain extra fine fiber having good quality without formation of a polymer-ball, i.e., a shot. More preferably the polyphenylene sulfide is a linear high polymer. Linear polyallylene sulfide high polymers are disclosed in, for example, Japanese Unexamined Patent Publication (Kokai) No. 61-7332, No. 61-66720, and No. 61-47734.

PPS resins generally have high oxidative properties and are apt to be partially cross-linked. For these reasons, problems arise when conventional spinning and drawing techniques are applied thereto. For examples, variations in processing times may make the fiber brittle and easily fractured. Furthermore, a high degree of filament breakage occurs when drawing an undrawn filament, and it is difficult to crimp the fiber due to high degrees of stiffness and slidability of the filament. For these reasons, it is impossible to apply to PPS fibers conventional methods, such as by use of a carding machine or the like, for manufacturing nonwoven fabric from a staple fiber.

Polyphenylene sulfide having a linear high polymer structure has high thermal stability in the molten state and a good flowability compared to cross-linked type polyallylene sulfide. Because of these characterestics, good nonwoven fabric composed of extra fine fibers having substantially no polymer balls can be obtained from PPS having a linear high polymer structure. The strength, elongation, and degree of whiteness of nonwoven fabric obtained from such PPS are high. Furthermore, additives, such as another polymer or the like may be blended with the PPS resin.

The mean diameter of the PPS fiber in accordance with the present invention is from 0.1 μm to 8.0 μm, preferably 0.5 μm to 6.0 μm, more preferably 1.0 μm to 5.0 μm. When the mean diameter is 0.1 μm or less, the PPS fiber is flexible, but the fiber strength is lowered, and thus the strength of the nonwoven fabric is also lowered. Further, the filtering characteristics are degraded. This may be because a plurality of the fibers become bundled together, giving inferior dispersibility of the individual fibers.

If the mean diameter of the fiber is 8.0 μm or more, the filtering characteristics and the flexibility of the nonwoven fabric are remarkably lowered.

It is difficult to determine the mean length of extra fine fiber obtained by a melt-flow method, because the extra fine fibers have an extremely small diameter. However, a length of 30 mm or more, in most cases, from 100 mm to 500 mm can be obtained. When PPS nonwoven fabric is manufactured by a paper making method, extra fine PPS fibers having a fiber length of from 3 mm to 30 mm, preferably 5 mm to 10 mm, are suitable.

The weight per unit area of the PPS fiber nonwoven fabric in accordance with the present invention is from 5 g/m² to 500 g/m², preferably 10 g/m² to 300 g/m², and more preferably 15 g/m² to 100 g/m². When the weight per unit area is 5 g/m² or less, the strength of the nonwoven fabric and the filtering characteristics are reduced. When the weight per unit area is 500 g/m² or more, the collecting efficiency is improved, but the pressure loss of a filter prepared from this nonwoven fabric becomes too high, to be suitable for filter applications.

Preferably, the bulk density of the PPS fiber nonwoven fabric in accordance with the present invention is 0.05 g/cm³ to 0.50 g/cm³, and more preferably 0.08 g/cm³ to 0.30 g/cm³. When the bulk density is 0.05 g/cm³ or less, the strength of the nonwoven fabric is lowered, and when the bulk density is 0.50 g/cm³ or more, the pressure loss of the filter prepared from the nonwoven fabric becomes high. The strength and the filtering characteristics of the nonwoven fabric are related to each other. Therefore, when a nonwoven fabric is prepared in which the weight per unit area is 5 g/m² to 500 g/m² and the bulk density is 0.05 g/cm³ to 0.50 g/cm³, the fabric has superior strength and filtering characteristics.

The melt flow rate of the extra fine PPS fiber constituting the nonwoven fabric in accordance with the present invention is 50 g per 10 minutes to 1,200 g per 10 minutes, preferably 80 g per 10 minutes to 800 g per 10 minutes, and more preferably 100 g per 10 minutes to 600 per 10 minutes. A nonwoven fabric prepared from material having a melt flow rate of 50 g per 10 minutes or less is unsuitable because the filtering characteristics thereof are inferior. This may be because in such fabrics there is a broad distribution of the diameters of fibers, i.e., a large variation of the fiber diameters, which results in the ready generation of polymer balls. For example, the variation in diameters, expressed by a standard deviation $\sigma$, is 1.0 μm or less when the melt flow rate is 50 g per 10 minutes or more. In contrast, the variation is 1.0 μm or more, and, in almost all cases 1.5 μm or more, when the melt flow rate is 50 g per 10 minutes or less.

A nonwoven fabric having a melt flow rate of 1,200 g per 10 minutes or more is unsuitable, because the strength thereof is low, and thus application of the nonwoven fabric is limited. To obtain both adequate strength and desirable filtering characteristics of the nonwoven fabric, it is especially preferable to use an extra fine fiber having a melt flow rate of 500 g per 10 minutes to 1,200 g per 10 minutes.

The melt flow rate of PPS polymers suitable for manufacturing extra fine fibers having the above melt flow rates is from 50 g per 10 minutes to 1,000 g per 10 minutes, preferably 100 g per 10 minutes to 600 g per 10 minutes.

To remarkably increase the filtering characteristics of nonwoven fabrics in accordance with the present invention, preferably each PPS fiber is dispersed at random as an individual fiber. Although preferably the nonwoven fabric in accordance with the present invention is composed only of the PPS fibers, fibers of other materials, powders or the like may be blended with the PPS fibers.

Melt blow methods, as well as paper making methods or the like, can be used to obtain the extra fine fiber nonwoven fabrics in accordance with the present invention. Preferably, however, a melt blow method is used.

An example of a melt blow method in accordance with the present invention will be explained with reference to FIGS. 1 and 2.

A PPS polymer is melted in an extruder 1 and fed to a die 2. The molten polymer is then extruded from a plurality of spinning orifices 12 arranged in a straight line in the die 2. A heated high pressure gas fed through pipe 3 is simultaneously injected from slits 15 arranged on both side of the orifice 12 to blow a stream of molten polymer. The molten polymer is drawn, thinned and set to a shape of an extra fine fiber 4 by the above high speed gas current. The thus obtained extra fine fibers are accumulated, while being agitated by the gas current, on a screen collector 7 circulating between a pair of rotational rollers 6, to form a random web 5. The obtained web 5 is moved away from the screen collector by a pair of calendar rolls 8.

Figure 2:
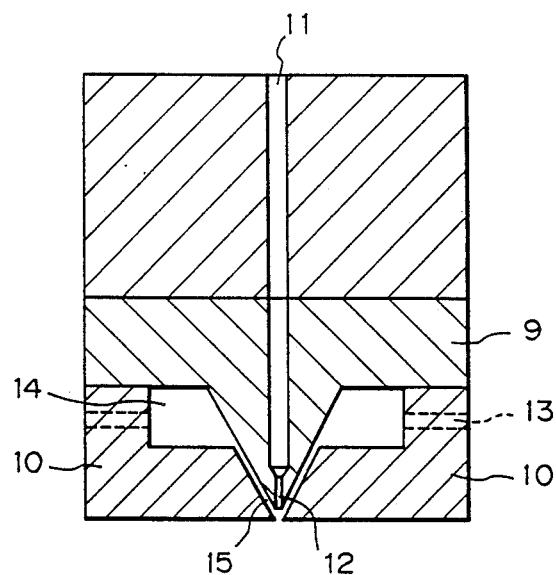

In FIG. 2, 9 denotes a middle portion of the nozzle 2, 10 a lower portion of the nozzle 2, i.e., a lip, 11 a passage for molten polymer, 13 a gas input, and 14 a gas header.

When the nonwoven fabric in accordance with the present invention is manufactured by a melt blow method, it has been found that a low temperature and high pressure blow method is desirable. Such a method is suitable for preventing heat deterioration of the PPS resin between the extruder and the die, and obtaining extra fine fiber nonwoven fabric having good quality. Therefore, the following manufacturing conditions may be suitably adopted. Namely a temperature in a cylinder of the extruder of 250° C. to 380° C., preferably 270° C. to 360° C., a temperature of the blowing gas of 300° C. to 410° C., preferably 320° C. to 390° C., more preferably 330° C. to 370° C., and a pressure of the blowing gas of 1.5 kg/cm$^2$G or more, preferably 2.0 kg/cm$^2$G to 5.0 kg/cm$^2$G. The temperature of the blowing gas is the temperature of the gas within the gas header 14, and steam or air is preferably used as the gas.

When a resin is melt-flowed under the above conditions, it is possible to keep the heat deterioration of the resin within the die to a minimum value. Furthermore, when obtaining a nonwoven fabric having a broad width, i.e., a width of 1.0 m or more, a remarkably uniform nonwoven fabric may be obtained. For example, a nonwoven fabric having an irregularity of weight per unit area in a widthwise direction of 10% or less more, can be obtained. Further a nonwoven fabric having substantially no polymer balls and having high strength can be obtained by using the above low temperature, high pressure, melt blow method.

The polymer ball or shot referred to in this specification is a spherical polymer mass having a diameter of about 10 to 500 times the diameter of the fibers constituting the web, or a bump-like irregularity generated on an end or in the middle portion of a fiber. Such polymer balls are extremely small and are almostly impossible to see by the naked eye. Therefore, polymer balls on the fibers can be observed only under a microscope or by closely studying a web including fibers with polymer balls. In the latter case, for ease of observation, density of the fibers in the web is increased by applying a pressing treatment, calendering treatment, interlacing treatment or the like to the web. If many polymer balls are present in the nonwoven fabric, application of the nonwoven fabric is extremely limited, and in particular, it is impossible to use the nonwoven fabric for high quality filter applications.

Since nonwoven fabric in accordance with the present invention has suitable strength, this nonwoven fabric per se can be used filters or the like. However, if desirable, the density and strength of the nonwoven fabric can be increased by applying a pressing treatment. Further if necessary, a hot pressing treatment, an embossing treatment, an ultrasonic bonding treatment, a resin treatment or the like can be applied to the nonwoven fabric. Further, it is possible to electret the fibers of the nonwoven fabric by a corona discharging method to improve the filtering characteristics of the nonwoven fabric.

As described above, a melt blow method or a paper making method can be used to manufacture nonwoven fabric in accordance with the present invention. In the latter method, a direct spinning method or a conjugated spinning method is combined with the paper making method. A melt blow method is used preferably because extra fine fiber, as well as a nonwoven fabric having a relatively high porosity i.e., a low bulk density, can be ready obtained in a single process.

Note, when the extra fine fiber is manufactured by a direct spinning method, generation of thread breakage can be reduced by decreasing the quantity of the PPS polymer extruded and rapidly cooling the extruded polymer at a position just under a spinneret, to obtain an undrawn fine filament. An extra fine filament can be then obtained by drawing the undrawn filament at a relatively slow speed, employing a special oil.

Since the nonwoven fabric in accordance with the present invention is composed of the PPS extra fine fibers, as described hereinbefore, the obtained nonwoven fabric has superior heat resistance, wet heat resistance, resistance to chemicals including acids and alkali, fire retardant and electrical insulating properties, and excellent filtering characteristics. Further, this nonwoven fabric is soft, and is stronger than a conventional nonwoven fabric, and has a high degree of whiteness and uniform distribution of weight per unit area in a widthwise direction. Also, substantially no polymer balls exist in the nonwoven fabric.

Furthermore, since nonwoven fabric having the above noted superior properties can be manufactured by one process, commercial advantages may be achieved. Moreover, since a binder is not needed when manufacturing the nonwoven fabric in accordance with the present invention, the filtering characteristics of the nonwoven fabric can be improved. This effect is more remarkable when a polyphenylene sulfide of a linear high polymer is used.

The PPS extra fine fiber nonwoven fabric in accordance with the present invention can be used for high-quality industrial filters, i.e., air filters, liquid filters, and oil and water separating filters, or the like. Further, the fabric is suitable for various applications, e.g., battery separator; disaster prevention material; building material including insulation, under material for roofs, wall material, sound proofing material; packing or gaskets for valves or the like; tape or the like; sheet material or the like; liner or the like; covering material; a lining; base cloth for a coated fabric; air-permeable waterproof cloth; wrapping material; pad; plastic-reinforcing material, electrical insulating material including a covering material for an electric wire; and a diaphragm or the like.

The nonwoven fabric in accordance with the present invention can be used as a plain sheet or as various products e.g., a special molded article manufactured by heat-molding in a die or through a series of molding rolls.

The present invention will be explained further by means of embodiments which in no way limit the invention. The definitions and measurements of various characteristics used throughout this specification, are as follows.

Apparent Density (g/cm$^3$)

The apparent density is calculated by thickness measured under a constant load of 130 g/cm$^2$ and a value of weight per unit area, of the nonwoven fabric.

Tensile Strength (kg/cm)

Sample of the nonwoven fabric having a length of 20 cm and the width of 1 cm were prepared, and the samples elongated to break them by an autograph having a gripping length of 1 cm. The tensile strength of the nonwoven fabric is the mean value of the maximum strengths obtained from the autograph.

Mean Diameter of the Fiber ($\mu$)

Ten randomly selected portions of the nonwoven fabric were photographed at a magnification of 2000 by an electromicroscope, and the diameters of 10 fibers appearing at 10 optical positions of a photograph were measured, and the measurement of the diameter was repeated for each of the 10 photographs. The mean diameter of the fiber is a mean value of the 100 values obtained.

Melt Flow Rate

The melt flow rate in this specification are obtained on the basis of the procedure of ASTM D-1238-82 wherein the load is 5 kg and the temperature is 315° C..

Irregularity of Weight per Unit Area

Samples having a length of 10 cm and the width of 10 cm were sequentially cut in a widthwise direction of a random web, and a weight of each sample measured. A mean value X and a difference R between a maximum value and a minimum value were obtained from the above weights and the irregularity of weight per unit area calculated by the following equation.

$$\text{Irregularity of Weight per Unit Area} = \frac{R}{X} \times 100$$

Collecting Efficiency and Pressure Loss

The collecting efficiency and the pressure loss were obtained by a collecting efficiency measuring method and a pressure loss measuring method using an aerosol of a stearic acid having a mean diameter of 0.3 $\mu$m, in accordance with JIS-8901, Testing Dust 13.B.

Flexibility

The flexibility was evaluated by the following organoleptic test.

Ten inspectors handled a sample of the nonwoven fabric, respectively, and the flexibility of the sample was evaluated by the following standard.

◎ : sample evaluated by seven or more inspectors as having a soft feeling,

○ : sample evaluated by five or six inspectors of as having a soft feeling, x : sample evaluated by four or less inspectors as having a soft feeling.

Embodiment 1

A polyallylene sulfide resin of a linear high polymer having a melt flow rate of 274 g per 10 minutes, was melted in an extruder after predrying, and fed into a die heated to a temperature of 330° C. The molten polymer was then extruded at an extrusion rate of 0.3 g/min/orifice from 1500 orifices each having a diameter of 0.3 mm$\phi$, respectively, and arranged in a straight line at a pitch of 1 mm therebetween, into a high speed steam current. The temperature of the steam was 350° C. in the lip header and the pressure of the steam was 4.0 kg/cm$^2$G. The obtained fibers group was continuously collected on a movable collecting face, pressed at room temperature under a pressure of 1.2 kg/cm, and a web having a weight per unit area of 50 g/m$^2$ and a bulk density of 0.28 g/cm$^3$ was obtained. The obtained extra fine fiber had a mean diameter of 1.5 $\mu$m and a melt flow rate of 313 g per 10 minutes.

The obtained extra fine fiber nonwoven fabric was a soft and superior nonwoven fabric having a tensile strength of 320 g/cm, and no generation of polymer balls could be seen on the nonwoven fabric. The irregularity of weight per unit area in the widewise direction of the obtained nonwoven fabric having a width of 1500 mm was only 5%, clearly showing a superior result. The colour of the nonwoven fabric was almost white, and when the nonwoven fabric was immersed in a 10% water solution of NaOH or in a 10% water solution of HCl, the colour of the nonwoven fabric did not change. The collecting efficiency of this nonwoven fabric was 93% and the pressure loss 29.5 mm H$_2$O, proving that this nonwoven had superior filtering characteristics.

Embodiments 2

In this embodiment, to obtain various nonwoven fabrics composed of fibers having different mean diameters, various nonwoven fabrics were prepared by changing extrusion rate and steam temperature and pressure, as shown in Table 1. In this embodiment, the same conditions as in embodiment 1 were used for the other manufacturing conditions including the polymer. The nonwoven fabric in this embodiment had a weight per unit area of 80 g/m$^2$ and a bulk density of 0.25 g/cm³. The properties of the nonwoven fabrics in this embodiment are shown in Table 2.

As can be seen from Table 2, the nonwoven fabrics in which the mean diameter of the fiber were between 0.1 μm and 8.0 μm, in accordance with the present invention, have superior tensile strength, filtering characteristics, and flexibility. In addition, with such fibers there is less generation of polymer balls.

TABLE 1

| Rate Extrusion (g/min/orifice) | Temperature of Gas (°C.) | Pressure of Gas (kg/cmG) | Mean Diameter of Fiber in Nonwoven Fabric (μ) |
|---|---|---|---|
| 0.10 | 390 | 6.0 | 0.05 |
| 0.10 | 370 | 4.0 | 0.1 |
| 0.15 | 350 | 3.5 | 0.5 |
| 0.30 | 350 | 3.5 | 2.0 |
| 0.30 | 350 | 2.5 | 4.0 |
| 0.40 | 330 | 2.3 | 6.0 |
| 0.40 | 320 | 1.8 | 8.0 |
| 0.40 | 320 | 1.4 | 9.0 |

TABLE 2

| Mean Diameter of Fibers in Nonwoven Fabric (μ) | Melt Flow Rate of Fiber (g/10 min) | Tensile Strength (g/cm) | Filtering Characteristics | | Flex-ibil-ity | Generation* of Polymer Balls | Remarks |
|---|---|---|---|---|---|---|---|
| | | | Collecting Efficiency (%) | Pressure Loss (mm H₂O) | | | |
| 0.05 | >1,200 | 160 | 47 | 4.5 | | o | Others |
| 0.1 | 1,100 | 250 | 75 | 18.0 | | o | Present invention |
| 0.5 | 752 | 360 | 90 | 26.0 | | o | Present invention |
| 2.0 | 308 | 420 | 96 | 28.0 | | o | Present invention |
| 4.0 | 295 | 480 | 88 | 20.5 | o | o | Present invention |
| 6.0 | 290 | 500 | 82 | 18.5 | o | o | Present invention |
| 8.0 | 286 | 510 | 71 | 17.0 | o | o | Present invention |
| 9.0 | 282 | 530 | 45 | 4.0 | x | x | Others |

Note:
For generation's polymer balls, o: slight x: widespread

Embodiment 3

In this embodiment, to obtain various nonwoven fabrics having different weights per unit area, various nonwoven fabrics were prepared by changing the speed of movement of the collecting face. Further to obtain various nonwoven fabrics having different bulk densities and the same weight per unit area, various nonwoven fabrics were prepared by changing the pressure applied to the nonwoven fabric at room temperature. In this embodiment, the same conditions as for embodiment 1 were used for the other manufacturing conditions. The mean diameter of the fiber in the nonwoven fabric of this embodiment was 1.5 μm, and the properties of the nonwoven fabrics of this embodiment are shown in Table 3.

As can be seen from the Table 3, the nonwoven fabrics having a weight per unit area of 5 g/cm² to 500 g/m² have superior tensile strength, filtering characteristics, and flexibility.

TABLE 3

| Weight per Unit Area (g/m²) | Bulk Density (g/cm³) | Tensile Strength (g/cm) | Filtering Characteristics | | Flex-ibil-ity | Re-marks |
|---|---|---|---|---|---|---|
| | | | Collecting Efficiency (%) | Pressure Loss (mm H₂O) | | |
| 3 | 0.30 | <50 | 41 | 2.0 | | Others |
| 5 | 0.30 | 100 | 60 | 3.0 | | Present invention |
| 10 | 0.30 | 150 | 65 | 4.5 | | Present invention |
| 15 | 0.30 | 180 | 68 | 5.0 | | Present invention |
| 60 | 0.03 | 200 | 82 | 8.0 | | Present invention |
| 60 | 0.05 | 300 | 92 | 12.0 | | Present invention |
| 60 | 0.30 | 370 | 96 | 28.5 | | Present invention |
| 60 | 0.50 | 400 | 97 | 32.0 | | Present invention |
| 60 | 0.60 | 410 | 97 | 45.0 | o | Present invention |
| 100 | 0.30 | 420 | 98 | 32.0 | | Present invention |
| 200 | 0.30 | 550 | >99 | 38.0 | o | Present invention |
| 300 | 0.30 | 720 | >99 | 45.0 | o | Present invention |
| 500 | 0.30 | 850 | >99 | 49.0 | o | Present invention |
| 600 | 0.30 | 860 | >99 | 67.0 | x | Others |

Embodiment 4 and Comparative Example 1

A nonwoven fabric having a weight per unit area of 100 g/m² and a bulk density of 0.32 g/cm³ was obtained by the same manufacturing method as used in Embodiment 1, after predrying a polyallylene sulfide resin having a melt flow rate of 50 g per 10 minutes. The thus obtained nonwoven fabric had fibers having a diameter of 5 μm, a melt flow rate of 55 g per 10 minutes, and a tensile strength of 530 g/cm. Further, this nonwoven fabric had superior filtering characteristics, i.e., a collecting efficiency of 78% and a pressure loss of 10 mmH$_2$O.

Further, a nonwoven fabric having a weight per unit area of 100 g/m$^2$ and a bulk density of 0.31 g/cm$^3$ was obtained by applying a melt blow method to a polyallylene sulfide resin having a melt flow rate of 75 g per 10 minutes. The obtained fiber has a mean diameter of 4 μm and a melt flow rate of 86 g per 10 minutes. This nonwoven fabric has superior properties, i.e., a tensile strength of 470 g/cm, a collecting efficiency of 81% and a pressure loss of 16 mmH$_2$O.

A comparative example 1 of nonwoven fabric was prepared by the same manufacturing method as used in embodiment 4, except that a polyallylene sulfide resin having a melt flow rate of 40 g per 10 minutes was used. The melt flow rate of the fiber in this comparative example was 45 g per 10 minutes and the mean diameter thereof was 8.5 μm. The collecting efficiency of this comparative example was 48% and the pressure loss 6.5 mmH$_2$O, and therefore the filtering characteristics of the comparative example 1 fabric were inferior compared with the fabric of Embodiment 4, i.e., in comparison to a nonwoven fabric in accordance with the present invention.

Embodiment 5

A polyallylene sulfide resin of a linear high polymer having a melt flow rate of 450 g per 10 minutes was predried and melt spun by a melt spinning testing machine under the following conditions, to produce a continuous filament:

| Nozzle: | Hole diameter: | 0.3 mm |
| | Hole number: | 10 |
| | Temperature: | 320° C. |
| Extrusion Rate: | | 0.05 g/min/head |
| Winding Speed: | | 250 m/min |
| Cooling: | | by air |

An oil comprising 40 wt% trioleyltrimelitate of wt% of isostearyloleate, a block copolymer composed of 80% ethylene oxide, 20% propylene oxide and of 25 wt% of a dodecylphenal ethyleneoxide adduct to 10 wt%, and 5 wt% of a diethanololeate amine salt was used in a 7% emulsification state. The oil was supplied to the spun filament by a roller. The pick up of the oil was between 0.1 wt% and 2.0 wt%.

Portions of wound filament having a very low yarn breakage rate and little fuzz were selected from a whole filament manufactured by the above process, and the selected portions of filament were drawn under the following conditions, by a hot plate.

| Drawing Speed: | 50 m/min |
| Drawing Temperature: | 90° C. |
| Drawing ratio: | 3.7 |

The diameter of the drawn filament was 7 μm and the melt flow rate thereof was 580 g per 10 minutes.

A plurality of the drawn filaments were bundled to form a tow, and the tow is cut to obtain staple fibers having a length of 5 mm. The staple fibers were dispersed in a 0.5% water solution of a polyacrylamide supplied by Meisei Kagaku Co., and formed into a sheet having a weight per unit area of 200 g/m$^2$ by a Hydroform Type inclined long net paper machine. High pressure water streams injected continuously under a pressure of 25 kg/cm$^2$ from a plurality of nozzles having a hole diameter of 0.2 mm were applied twice on both sides of the sheet, to interlace the fibers in the sheet.

An electreting treatment was applied of the interlaced sheet by passing the interlaced sheet at a speed of 5 m/min, while guided by a metal roller, under needle electrodes to which a voltage of 15 KV was applied.

The obtained sheet has a collecting efficiency of 85%, a pressure loss of 25 mmH$_2$O, and a tensile strength of 350 g/cm.

Comparative Example 2

A comparative Example 2 of nonwoven fabric was prepared by the same manufacturing method as for Embodiment 2, except that a cross linking type PPS resin, i.e., "Layton" supplied from Philips Petroleum Co., was melt blown. The mean diameter of the obtained fiber was 9 μm, and the weight per unit area of the obtained nonwoven fabric was 100 g/cm$^2$. This nonwoven fabric had a slightly yellowish colour and many polymer balls. Further the tensile strength of this nonwoven fabric was low, i.e., 140 g/cm, and since the collecting efficiency was 36% and the pressure loss 6.2 mmH$_2$O in this nonwoven fabric, the filtering characteristics thereof were inferior.

We claim:

1. A nonwoven fabric having a weight per unit area of 10 g/m$^2$ to 200 g/m$^2$ and a bulk density of 0.05 g/cm$^3$ to 0.50 g/cm$^3$ composed of an extra fine fiber obtained by melt-blowing a linear polymer of polyphenylene sulfide, wherein the mean diameter of the extra fine fiber is from 0.1 μm to 8.0 μm, and the melt flow rate of the extra fine fiber, measured under the condition of a load of 5 kg and a temperature of 315° C. in accordance with ASTM D-1238-82, is from 50 g per 10 minutes to 1,100 g per 10 minutes.

2. A nonwoven fabric according to claim 1, wherein the melt flow rate of said polyphenylene sulfide fiber is from 80 g per 10 minutes to 800 g per 10 minutes.

3. A nonwoven fabric according to claim 2, wherein the melt flow rate of said polyphenylene sulfide fiber is from 100 g per 10 minutes to 600 g per 10 minutes.

4. A nonwoven fabric according to claim 1 produced by a paper making method.

5. A nonwoven fabric according to claim 1, wherein the melt flow rate of said linear polymer of polyphenylene sulfide, measured by the same method as that used to measure the melt flow rate of said extra fine fiber, is from 50 g per 10 minutes to 1,000 g per 10 minutes.

6. A filter composed of a nonwoven fabric according to claim 1.

* * * * *